(12) United States Patent
Halstead

(10) Patent No.: US 11,718,763 B2
(45) Date of Patent: Aug. 8, 2023

(54) TUNG OIL-BASED NON-LAPPING WATER-COMPATIBLE WOOD STAIN

(71) Applicant: Joshua Halstead, Parma, OH (US)

(72) Inventor: Joshua Halstead, Parma, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 13 days.

(21) Appl. No.: 17/381,736

(22) Filed: Jul. 21, 2021

(65) Prior Publication Data

US 2021/0403743 A1 Dec. 30, 2021

Related U.S. Application Data

(63) Continuation of application No. 15/722,710, filed on Oct. 2, 2017, now Pat. No. 11,091,664.

(60) Provisional application No. 62/401,986, filed on Sep. 30, 2016.

(51) Int. Cl.

| | | |
|---|---|---|
| C09D 15/00 | (2006.01) | |
| C08L 91/00 | (2006.01) | |
| C09K 23/00 | (2022.01) | |
| C09D 7/43 | (2018.01) | |
| C09D 7/41 | (2018.01) | |
| C08F 242/00 | (2006.01) | |
| C08K 5/17 | (2006.01) | |
| C08L 71/02 | (2006.01) | |
| C09D 5/02 | (2006.01) | |
| C09D 167/08 | (2006.01) | |

(52) U.S. Cl.
CPC ............ C09D 15/00 (2013.01); C08F 242/00 (2013.01); C08K 5/17 (2013.01); C08L 71/02 (2013.01); C08L 91/005 (2013.01); C09D 5/027 (2013.01); C09D 5/028 (2013.01); C09D 7/41 (2018.01); C09D 7/43 (2018.01); C09D 167/08 (2013.01); C09K 23/00 (2022.01); *C08L 2201/56* (2013.01)

(58) Field of Classification Search
CPC . C09D 15/00; C09D 7/43; C09D 7/41; C09D 5/027; C09D 5/028; C09D 167/08; B01F 17/0028; C08F 242/00; C08K 5/17; C08L 71/02; C08L 91/005; C08L 2201/56
USPC ..................... 106/253; 516/53, 77
See application file for complete search history.

(56) References Cited

U.S. PATENT DOCUMENTS

| | | | | |
|---|---|---|---|---|
| 2,194,218 | A | | 3/1940 | Dickeson |
| 2,391,041 | A | | 12/1945 | Stamberger |
| 3,379,548 | A | | 4/1968 | Jen |
| 3,733,294 | A | * | 5/1973 | Keown ...................... C08J 3/02 523/310 |
| 3,810,855 | A | * | 5/1974 | Tugukuni ............... C08G 18/36 523/513 |
| 4,750,934 | A | | 6/1988 | Metzner |
| 5,116,408 | A | | 5/1992 | Crozer |
| 7,309,684 | B2 | | 12/2007 | Filippini |
| 9,200,177 | B2 | | 12/2015 | Young |
| 9,321,883 | B2 | | 4/2016 | Roussel |
| 11,091,664 | B2 | * | 8/2021 | Halstead ................. C08L 71/02 |
| 2003/0212182 | A1 | | 11/2003 | Kayima |
| 2004/0194658 | A1 | | 10/2004 | Konno |
| 2005/0113504 | A1 | | 5/2005 | Kuo |
| 2006/0258555 | A1 | | 11/2006 | Filippini |
| 2007/0117922 | A1 | | 5/2007 | Kayima |
| 2007/0142520 | A1 | | 6/2007 | Pogue |
| 2008/0038977 | A1 | | 2/2008 | Lebduska |
| 2008/0275168 | A1 | | 11/2008 | Schierlmann |
| 2010/0048787 | A1 | | 2/2010 | Shapiro |
| 2011/0065856 | A1 | | 3/2011 | Anchor |
| 2012/0309897 | A1 | | 12/2012 | Boettcher |
| 2014/0024742 | A1 | | 1/2014 | Kan |
| 2014/0135442 | A1 | | 5/2014 | Billiani |
| 2016/0280939 | A1 | | 9/2016 | Olszanski |

FOREIGN PATENT DOCUMENTS

| | | | | |
|---|---|---|---|---|
| JP | 2003211085 A | * | 7/2003 | ......... C08G 18/8093 |
| WO | 1992011326 | | 7/1992 | |
| WO | 199404620 | | 3/1994 | |
| WO | WO-2008076360 A2 | * | 6/2008 | ........... C09D 167/08 |

OTHER PUBLICATIONS

PCT International Search Report, dated Jan. 18, 2018.
PCT Written Opinion of the International Searching Authority, dated Jan. 18, 2018.

* cited by examiner

*Primary Examiner* — Patricia L. Hailey
(74) *Attorney, Agent, or Firm* — Morgan Lewis & Bockius LLP

(57) ABSTRACT

Water-based stains are based on an oil-in-water emulsion having a binder that includes, consists of, or consists essentially of drying oil combined with a non-aqueous polymer dispersion. The compositions can be tinted using traditional water-based pigment dispersions, yet the overall hydrophobicity results in minimal interaction with the polar cellulosic structure of wood.

10 Claims, No Drawings

TUNG OIL-BASED NON-LAPPING WATER-COMPATIBLE WOOD STAIN

CROSS-REFERENCE TO RELATED APPLICATION

This application is a continuation of U.S. patent application Ser. No. 15/722,710, filed Oct. 2, 2017, which claims the benefit of and priority to U.S. Provisional Patent Application No. 62/401,986, filed Sep. 30, 2016, all of which are incorporated by reference in their entirety.

TECHNICAL FIELD

The subject matter hereof relates to staining of wood products such as hardwood floors and furniture.

BACKGROUND

Wood floors are frequently employed in quality housing and offices. The bare wood may be stained to alter its color, enabling, for example, the use of durable, damage-resistant wood whose natural color would be unsuitable for its surroundings. Stains may be oil-based or water-based. The latter offer numerous advantages such as soap-and-water cleanup, non-flammability, low odor, and minimal environmental impact. Currently, however, water-based wood stains are used primarily for small jobs. They have not been widely adopted in the flooring and large-furniture sectors because they tend to exhibit various problems such as lapping, lifting, difficulty in application, and/or inconsistent appearance.

Lapping is a visual defect that occurs when applying stain to a large surface in sections. It results in a darker color in the areas where one stained section overlaps another. Lapping often results from pigment particles interacting strongly with water-based polymers, which themselves interact strongly with the wood surface. Lifting is observed when a stain is either not completely dry, or is water/solvent sensitive when a topcoat is applied thereover. This results in reduced clarity and loss of adhesion between the stain and the topcoat.

Application difficulty often arises when staining large areas by hand using rags, as is common practice. Existing water-based stains are often "sticky" and require substantial effort in initially applying the stain and wiping excess away. Following application, it is usually found that water-based stains lack the richness and warmth of oil/solvent based stains. This results in an inconsistent appearance that resembles plastic.

Accordingly, there is a need for stains that offer the advantages of a water-based product without the disadvantages noted above.

SUMMARY

In various embodiments, a water-based stain in accordance herewith is an oil-in-water emulsion having a binder that includes, consists of, or consists essentially of drying oil combined with a non-aqueous polymer dispersion. Compositions in accordance herewith can be tinted using traditional water-based pigment dispersions, yet the overall hydrophobicity results in minimal interaction with the polar cellulosic structure of wood. The result is minimal stickiness during application, which not only eases application but also provides advantageous lapping resistance. Upon evaporation of water, the binder undergoes oxidative curing and can be top coated with either water-based or oil-based polyurethane clear coats after 2-6 hours with no or minimal lifting. The oil-based nature of the binder also provides warmth and richness to wood substrates, yielding a superior visual appearance.

In one aspect, the invention pertains to a wood stain composition including a binder consisting essentially of drying oil and a non-aqueous polymer dispersion. The non-aqueous polymer dispersion may be an alkyd dispersion. In various embodiments, the composition further includes a water-based pigment dispersion. In addition, the composition may include a thickener. In one embodiment, the thickener consists essentially of hydroxyethylcellulose, hydrophobically-modified ethylene oxide-based urethanes, or hydrophobically-modified alkali soluble emulsions.

The composition may further include a defoamer. In addition, the composition may include an amine. The amine may consist essentially of dimethylethanolamine, monoethylethanolamine, trimethylethanolamine, morpholine, or ammonia. In some embodiments, the composition includes one or more drying agents. Additionally, the composition may include a surfactant. The surfactant may have a hydrophile-lipophile balance value between 5 and 15. In one implementation, the surfactant is an octylphenol ethoxylate surfactant.

In another aspect, the invention relates to a method of making a wood stain composition. In various embodiments, the method includes the steps of forming the first mixture by combining drying oil and a non-aqueous polymer dispersion; forming the second mixture by combining water and a surfactant; adding the first mixture to the second mixture to form a third mixture; and mixing the third mixture until a smooth uniform state is achieved. The non-aqueous polymer dispersion may be an alkyd dispersion. In addition, the surfactant may have a hydrophile-lipophile balance value between 5 and 15. In one implementation, the surfactant is an octylphenol ethoxylate surfactant. In some embodiments, the method may further include adding a pigment composition to the third mixture.

In various embodiments, the second mixture includes a thickener. The thickener consists essentially of hydroxyethylcellulose, hydrophobically-modified ethylene oxide-based urethanes, or hydrophobically-modified alkali soluble emulsions. In addition, the second mixture may further include a defoamer. In one embodiment, the second mixture includes an amine. The amine consists essentially of dimethylethanolamine, monoethylethanolamine, trimethylethanolamine, morpholine, or ammonia. In various embodiments, the first mixture further includes one or more drying agents. Additionally, the first mixture may include one or more viscosity reducing agent.

As used herein, the term "non-aqueous polymer dispersion" means a film-forming polymer, such as a polyester, acrylic, urethane, or alkyd material, dispersed in particulate form in a non-aqueous medium. Dispersion avoids the negative effects of polymer insolubility with drying oil. The term "substantially" or "approximately" means±10% (e.g., by weight or by volume), and in some embodiments, ±5%. The term "consists essentially of" means excluding other materials that contribute to function or structure. For example, the optional pigment does not contributed to the performance of the coating and may be omitted in favor of the light tint imparted by drying oil; hence, it would not be excluded in a claim to a composition consisting essentially of other materials. Percentages refer to weight percentages unless otherwise indicated.

DETAILED DESCRIPTION

Drying oils, which consist of glycerol triesters of fatty acids, such as tong oil and linseed oil are a popular finish for wood because of their protective properties and visual appearance. When dried, the drying oils impart a satin "wetted wood" look with a slight golden tint. Because of their viscosity, drying oils may be diluted with solvent, resulting in compositions that are easily applied but which can pose environmental risks. As noted earlier, water-based drying oil staining and finishing compositions, while less environmentally problematic, can exhibit numerous performance disadvantages. Compositions in accordance herewith achieve water compatibility without sacrificing ease of application and post-application performance properties.

By itself, a binder of drying oil and a non-aqueous dispersion is not water-compatible, but formulations in accordance herewith utilize a surfactant to confer aqueous compatibility without sacrificing the benefits (in terms of application convenience and appearance) of the nonpolar drying oil.

A suitable generic formulation is as follows:

| Component | Weight % |
| --- | --- |
| Amine | 0.1%-2% |
| Thickener | 0.1%-2% |
| Defoamer | 0.1%-1% |
| Surfactant (HLB-Value between 5-15) | 0.1%-5% |
| Pigment dispersion | 2%-15% |
| Non-aqueous alkyd dispersion | 0.5%-10% |
| Aliphatic Solvent | 5%-40% |
| Drying oil | 5%-40% |
| Metallic Driers (consisting of cobalt, calcium, magnesium, and/or zirconium) | 0.1%-5% |

The thickener is used to adjust the viscosity of the composition to a desired value. Suitable thickeners include hydroxyethylcellulose, hydrophobically-modified ethylene oxide-based urethanes, hydrophobically-modified alkali soluble emulsions, and/or other alkali-soluble associative thickeners. The amine, in turn, is used to activate the thickener. Suitable amines include dimethylethanolamine, monoethylethanolamine, trimethylethanolamine, morpholine, and/or ammonia. The defoamer is employed break foam generated during formula processing and/or application of the stain onto wood; suitable defoamers include deaerators such as AIREX 900, available from TEGO. All three of these components are optional. The surfactant may have a hydrophile-lipophile balance (HLB) value between 5 and 15. The other ingredients are drying agents, which are desirable to minimize time between coats or application of a finish, but can be omitted in whole or in part. Other conventional drying agents known to those skilled in the art may also or alternatively been employed. The CEM-ALL and DRI-RX HF products are available from Borchers Americas, Inc.

A representative working formulation is as follows:

| Description | Weight % |
| --- | --- |
| Water | 41.6500% |
| Dimethylethanolamine-anhydrous | 0.2000 % |
| 300 molecular weight hydroxyethylcellulose thickener | 0.2000 % |
| TEGO AIREX 900 | 0.2000 % |
| TRITON X-405 | 0.2500 % |
| SUPER SEATONE burnt umber dispersion | 7.0000 % |
| 396250-NAD | 4.0000 % |
| Mineral spirits | 7.400 % |
| APS-D4 octamethylcyclotetrasiloxane | 10.600 % |
| Raw Drying Oil (Tung Oil) | 24.000 % |
| 10% calcium CEM-ALL | 1.0000 % |
| 12% cobalt drier CEM-ALL | 1.0000 % |
| 18% Zr 2-ethylhexanoate | 1.0000 % |
| DRI-RX HF 2,2'-bipyridyl solution | 0.5000 % |
| Methyl ethyl ketoxime | 1.0000 % |

TRITON X-405 is polyoxyethylene (40) isooctylcyclohexyl ether, a nonionic surfactant available from Sigma-Aldrich. The SUPER SEATONE burnt umber dispersion is an aqueous (water/propylene glycol) dispersion available from DyStar Singapore Pte Ltd. 396250-NAD is an alkyd non-aqueous polymer dispersion (NAD) proprietary to Sherwin Williams Company and is an optional ingredient; it serves to reduce dry time and/or water sensitivity of the stain. APS-D4 octamethylcyclotetrasiloxane is available from Advanced Polymer, Inc., and serves to reduce the viscosity of the drying oil.

Mixing is performed in a two-part process. Part 1 involves the NAD, mineral spirts, APS-D4, tung oil, and the various drier components. These are combined in a vessel and well mixed. Part 2 is carried out in a separate vessel that contains the water, amine, thickener, defoamer, and surfactant, which are mixed to a homogeneous state. At this point the Part 1 contents are slowly added to Part 2 under agitation and mixed until a smooth uniform state is achieved. The system can be then pigmented using any suitable pigment composition (most common water-based pigments dispersions can be employed) to the desired color space.

While the invention has been described in conjunction with the specific embodiments thereof, one of ordinary skill in the art will understand that any alternatives, modifications, and variations of the types of the ingredients and/or the amounts thereof contained in the single formula finish are possible and are they within the scope of the present invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of making a wood stain composition, the method comprising the steps of:
    forming a first mixture by combining drying oil and a non-aqueous polymer dispersion;
    forming a second mixture by combining water and a surfactant;
    adding the first mixture to the second mixture to form a third mixture, and mixing the third mixture until a smooth uniform state is achieved.

2. The method of claim 1, further comprising adding a pigment composition to the third mixture.

3. The method of claim 1, wherein the non-aqueous polymer dispersion is an alkyd dispersion.

4. The method of claim 1, wherein the second mixture further comprises a thickener.

5. The method of claim 1, wherein the second mixture further comprises a defoamer.

6. The method of claim 1, wherein the second mixture further comprises an amine.

7. The method of claim 1, wherein the first mixture further comprises at least one drying agent.

8. The method of claim 1, wherein the first mixture further comprises at least one viscosity reducing agent.

9. The method of claim 1, wherein the surfactant has a hydrophile-lipophile balance value between 5 and 15.

10. The method of claim 1, wherein the surfactant is an octylphenol ethoxylate surfactant.

* * * * *